United States Patent
Origuchi et al.

(10) Patent No.: US 9,174,544 B2
(45) Date of Patent: Nov. 3, 2015

(54) METHOD FOR CHARGING A BATTERY FOR SUPPLYING POWER TO A DRIVE MOTOR OF A MOTOR VEHICLE

(75) Inventors: Masato Origuchi, Rambouillet (FR); Caroline Marchal, Montigny le Bretonneux (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 270 days.

(21) Appl. No.: 13/883,072

(22) PCT Filed: Nov. 3, 2011

(86) PCT No.: PCT/EP2011/069351
§ 371 (c)(1),
(2), (4) Date: Jul. 23, 2013

(87) PCT Pub. No.: WO2012/059551
PCT Pub. Date: May 10, 2012

(65) Prior Publication Data
US 2013/0300361 A1    Nov. 14, 2013

(30) Foreign Application Priority Data
Nov. 5, 2010 (FR) ...................................... 10 59121

(51) Int. Cl.
| | | |
|---|---|---|
| *B60L 11/00* | (2006.01) | |
| *B60L 11/18* | (2006.01) | |
| *H01M 10/44* | (2006.01) | |
| *H02J 7/00* | (2006.01) | |
| *H01M 10/613* | (2014.01) | |

(52) U.S. Cl.
CPC ......... *B60L 11/1809* (2013.01); *B60L 11/1862* (2013.01); *B60L 11/1874* (2013.01); *H01M 10/443* (2013.01); *H01M 10/613* (2015.04); *H02J 7/0042* (2013.01); *H02J 7/0052* (2013.01); *B60L 2240/545* (2013.01); *B60L 2240/547* (2013.01); *H01M 10/446* (2013.01); *Y02T 10/705* (2013.01); *Y02T 10/7005* (2013.01); *Y02T 10/7044* (2013.01)

(58) Field of Classification Search
None
See application file for complete search history.

(56) References Cited

U.S. PATENT DOCUMENTS

| | | | |
|---|---|---|---|
| 6,215,281 B1 | 4/2001 | Koch | |
| 6,624,615 B1 | 9/2003 | Park | |
| 7,609,033 B2 * | 10/2009 | Sasaki et al. | 320/150 |
| 8,525,480 B2 * | 9/2013 | Anderson | 320/132 |
| 2007/0152640 A1 | 7/2007 | Sasaki et al. | |
| 2011/0320082 A1 * | 12/2011 | Ishishita | 701/22 |

FOREIGN PATENT DOCUMENTS

| | | |
|---|---|---|
| EP | 1 806 248 | 7/2007 |
| JP | 6 217415 | 8/1994 |
| JP | 2002 352866 | 12/2002 |

(Continued)

OTHER PUBLICATIONS

International Search Report Issued Feb. 2, 2012 in PCT/EP11/69351 Filed Nov. 3, 2011.

*Primary Examiner* — Leigh Garbowski
(74) *Attorney, Agent, or Firm* — Oblon, McClelland, Maier & Neustadt, L.L.P.

(57) ABSTRACT

A method for charging a battery, including: determining a final state of charge and a final temperature of the battery; and calculating charging power and/or cooling power required to reach the two final values within a minimum amount of time.

13 Claims, 2 Drawing Sheets

(56) References Cited

FOREIGN PATENT DOCUMENTS

| JP | 2004 159379 | 6/2004 |
| JP | 2006 73406 | 3/2006 |
| JP | 2007 336691 | 12/2007 |
| JP | 2010 233360 | 10/2010 |

* cited by examiner

METHOD FOR CHARGING A BATTERY FOR SUPPLYING POWER TO A DRIVE MOTOR OF A MOTOR VEHICLE

BACKGROUND

The present invention relates to a method for charging a battery, particularly suited to the charging of a battery of an electric motor vehicle. It also relates to a charger and a battery recharging station using such a method.

Certain motor vehicles, such as electric or hybrid vehicles, comprise a battery for supplying power to an electric drive motor. Such a battery regularly requires charging since it discharges during its use.

A method for charging a battery is for example described in document US 2009/0309546. Such a method is however not very efficient. The total time of a battery-charging phase is a very important parameter for developing the practicality of the electric vehicle. Moreover, a battery-charging phase demands a particular installation fulfilling not only the charging function but also a cooling function because the battery heats up while it is being charged. Cooling makes it possible to optimize the service life of the battery and provide the customer with a battery at a temperature that is low enough for him to be able to obtain the maximum performance of the battery on his journey. The drawback of the existing charging methods arises from the fact that they are not optimized: notably, the management of the cooling of the battery is independent of the management of its charging, and situations arise in which the electric charging is ended but the charging phase continues only in order to finalized the cooling of the battery. In such a case, the charging time is lengthened solely for managing the cooling, and this is not optimal.

BRIEF SUMMARY

Therefore, there is a need to improve the methods for charging batteries and the aim of the invention is to optimize the phases of charging drive batteries of motor vehicles.

More particularly, one object of the invention is to optimize the battery charging time while reaching a satisfactory final state of charge and satisfactory final temperature.

Accordingly, the invention is based on a method for charging a battery, characterized in that it comprises the following steps:

(E1)—determination of a final state of charge ($SOC_{end}$) and a final temperature ($T_{end}$) of the battery;
(E2)—computation of the charging power ($P_{Ch}$) and/or of the cooling power ($P_{cool}$) necessary for reaching the two final values ($SOC_{end}$; $T_{end}$) in a minimum time.

Step (E2) can define a charging time making it possible to reach, in substantially the same time, the final state of charge ($SOC_{end}$) and the final temperature ($T_{end}$) of the battery.

Step (E1) may comprise the determination of a final state of charge and of a final temperature of the battery as a function of some or all of the following parameters:
- state of the charging station using the charging method;
- state of the charger using the charging method;
- state of the battery to be recharged.

Step (E2) may consider the following equations:

$$\Delta T_{bat} = T_{end} - T_{ini} = \frac{(Q_{bat} - P_{cool})}{C_p} \times t_{ch} \quad (1)$$

$$t_{ch} = \frac{\Delta SOC \times E_{bat}}{P_{ch}} \quad (2)$$

$$P_{cool} = \frac{\left(\frac{T_{end} + T_{ini}}{2} - 5\right)}{Rth} \quad (3)$$

$$Q_{bat} = R_{bat}\left(\frac{P_{ch}}{U\_nom}\right)^2 \quad (4)$$

where:

$T_{ini}$: temperature of the battery in each time frame [° C.]
$SOC_{ini}$: state of charge SOC of the battery
$C_p$: calorific capacity of the battery [Wh/K]
$E_{bat}$: energy of the battery [Wh]
Rth: thermal resistance between the battery and the blown air [K/W]
$R_{bat}$: electrical resistance of the battery [ohm]
$U_{bat}$: voltage of the battery [V]
$u_{nom}$: nominal voltage of the battery
Qbat: charge of the battery
$P_{cool}$: cooling power during charging [W]
$t_{ch}$: charging time remaining [h]
$P_{Ch}$: charging power [W]
$P_{Ch,max}$ maximum charging power [W]

These equations can be resolved before initiating the charging of the battery and/or over a predetermined time period during the charging of the battery.

The thermal resistance (Rth) of the cooling device can be fixed and the step (E2) can compute the charging power ($P_{ch}$) as a function of this thermal resistance (Rth).

The charging power can be computed by the following formula:

$$P_{ch} = \left(\frac{-B + V\Delta}{2A}\right)$$

where:

$$\Delta = B^2 - 4AC$$

$$\underbrace{\left[\Delta SOC \times E_{bat} \times R_{bat}\left(\frac{1}{U_{nom}}\right)^2\right]}_{A} \times P_{ch}^2 +$$

$$\underbrace{\frac{(T_{ini} - T_{end}) \times C_p}{B} \times P_{ch}}_{B} + \underbrace{\Delta SOC \times E_{bat} \times \left(\frac{5 - \frac{T_{end} + T_{ini}}{2}}{Rth}\right)}_{C} = 0$$

The method for charging a battery can also compute a maximum charging power ($P_{max}$) dependent on the charging station and on the battery to be charged.

The thermal resistance (Rth) of the cooling device can be variable and the step (E2) can compute this thermal resistance (Rth) as a function of the charging power ($P_{ch}$).

The thermal resistance (Rth) can be computed by the following formula:

$$Rth = \frac{\frac{T_{end} + T_{ini}}{2} - 5}{R_{bat}\left(\frac{P_{ch}}{U_{avg}}\right)^2 - \frac{(T_{end} - T(t)) \times C_p \times P_{ch}}{\Delta SOC \times E_{bat}}}$$

The method for charging a battery may also comprise a step of reading of the temperature, of the state of charge and of potential other parameters characterizing the state of the battery and communication of the result to the charging device.

The invention also relates to a battery charger, comprising an electrical charging device which delivers a charging power ($P_{Ch}$), characterized in that it comprises a cooling device, which delivers a cooling power ($P_{co}oi$), an input for receiving a final state of charge ($SOC_{en}d$) and a final temperature ($T_{en}d$) of the battery and a control unit which computes the charging power ($P_{C}h$) and/or the cooling power ($P_{\infty}oi$) necessary for reaching the two final values (SOCend; Tend) in a minimum time.

The cooling device may comprise a variable flow rate and/or a variable temperature of coolant, so as to modify the cooling power as a function of the charging power.

Finally, the invention also relates to a station for managing batteries for supplying power to a drive motor of a motor vehicle, characterized in that it comprises at least one control unit which uses the charging method described above.

BRIEF DESCRIPTION OF THE DRAWINGS

These subjects, features and advantages of the present invention will be explained in detail in the following description of a particular embodiment made in a nonlimiting way with respect to the attached figures, as follows.

DETAILED DESCRIPTION

The concept of the invention is based on a charging method in which the charging power and/or the cooling power are computed to reach desired values in an optimum time.

Figure 1:
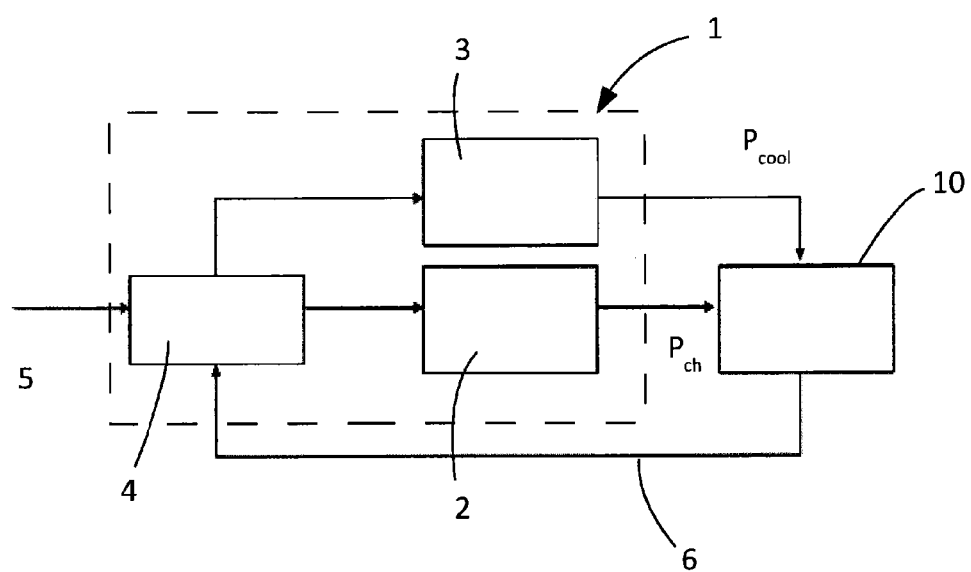
FIG. 1 represents schematically a battery charger in one embodiment of the invention.

FIG. 1 illustrates schematically a charger 1 according to one embodiment of the invention, which comprises an electric charging device 2, which delivers a charging power $P_{C}h$, and a cooling device 3, which delivers a cooling power $P_{\infty 0}1$ to a battery 10. The device also comprises a control unit 4 which uses a charging method according to the invention, which will be described below. This control unit comprises software and/or hardware means notably for determining the optimum power values $P_{C}h$ and $P_{co}oi$ which may comprise a computer. For this, the charger 1 receives as an input 5 the desired final temperature $T_{en}d$ of the battery and the desired final state of charge $SOC_{en}d$. The device also comprises means for reading of the temperature $Tb_{a}t$ of the battery charge SOCbat, not shown, of which the values are transmitted to the control unit 4 by a communication means 6. These measurements may be taken initially, before initiating a charging phase, and then optionally during charging in order to determine the end of charging. According to one advantageous embodiment, these measurements may be repeated periodically and serve as a basis for a regulation of the charging phase, as will be explained in detail below. The communication means 6 may also allow the battery 10 to transmit to the control unit 4 additional data characterizing the state of the battery, such as its electric resistance (either directly or via the voltage and the current), its maximum admissible charging power and its useable energy for example. The reading of these data makes it possible to replace in the computation the reference data previously stored in the element 4 with the values read in real time.

The control unit 4 uses a computation of the optimal powers $P_{C}h$ and $P_{cool}$ as a function of the desired final values, which represent setpoint values, of the initial state of the battery, and of the intrinsic parameters of the battery and of the characteristics of the cooling device. Accordingly, the control unit 4 stores the information concerning the battery thermal resistance Rth (potentially a mapping as a function of the flow-rate range available in the station) and the information concerning the battery calorific capacity.

For example, for a final charging setpoint $SOC_{en}d$ equal to 100% and a cooling system with a constant coolant flow rate, characterized for example by a constant thermal resistance between the blown air at 5° C. and the battery (considered isolated in this instance), the control unit 4 can resolve the following equations:

$$\Delta T_{bat} = T_{end} - T_{ini} = \frac{(Q_{bat} - P_{cool})}{C_p} \times t_{ch} \quad (1)$$

$$t_{ch} = \frac{\Delta SOC \times E_{bat}}{P_{ch}} \quad (2)$$

$$P_{cool} = \frac{\left(\frac{T_{end} + T_{ini}}{2} - 5\right)}{Rth} \quad (3)$$

$$Q_{bat} = R_{bat}\left(\frac{P_{ch}}{A_{nom}}\right)^2 \quad (4)$$

$$\Delta Tba \times C_p \times P_{ch} = \Delta SOC \times E_{bat} \times (Q_{bat} - P_{cool}) \quad (5)$$

$$(T_{end} - T_{ini}) \times C_p \times P_{ch} = \quad (6)$$
$$\Delta SOC \times E_{bat} \times \left(R_{bat}\left(\frac{P_{ch}}{U_{nom}}\right)^2 - \frac{\left(\frac{T_{end} + T_{ini}}{2} - 5\right)}{Rth}\right)$$

The previous equation may also be written in the following form, as a second order polynomial in which the unknown is the charging power $P_{C}h$:

$$\underbrace{\left[\Delta SOC \times E_{bat} \times R_{bat}\left(\frac{1}{U_{nom}}\right)^2\right]}_{A} \times P_{ch}^2 +$$
$$\underbrace{(T_{ini} - T_{end}) \times C_p \times P_{ch}}_{B} + \underbrace{\Delta SOC \times E_{bat} \times \left(\frac{5 - \frac{T_{end} + T_{ini}}{2}}{Rth}\right)}_{C} = 0$$

This equation is resolved by defining:

$$\Delta = B^2 - 4AC$$

Finally, the final value adopted for the charging power is the value given by the resolution of the previous equation system if it is below the maximum value of the charging power allowed by the battery and the charger, or this maximum value in other cases $$P_{ch} = \min\left(P_{ch,max}, \frac{-B + \sqrt{\Delta}}{2A}\right)$$

where:

$T_{ini}$: temperature of the battery in each time frame [° C.]

$SOC_{ini}$: state of charge SOC of the battery $C_p$: calorific capacity of the battery [Wh/K]

$E_{bat}$: energy of the battery [Wh]

Rth: thermal resistance between the battery and the blown air [K/W]

$R_{bat}$: electrical resistance of the battery [ohm]

$U_{bat}$: voltage of the battery [V]

$u_{nom}$: nominal voltage of the battery

Qbat: charge of the battery $P_{cool}$: cooling power during charging [W]

$t_{ch}$: charging time remaining [h]

$P_{ch}$: charging power [W]

$P_{Ch,max}$: maximum charging power [W]

The equations (1), (3) and (4) characterize the thermal exchange used by the cooling device 3 of the battery and the equation (2) characterizes the electric charge of the battery, used by the charging device 2.

The equation (5) is obtained by combining the equations (1) and (2) then the equation (6) is obtained by combining the equations (5), (3) and (4).

Then, based on the value of the charging power as defined above, it is easy to compute the cooling power $P_{cool}$ and the charging time $t_ch$.

As a note, the above equations are resolved before the beginning of a charging phase. However, they may also be resolved during charging, over a predefined period with a given time frame, taking account of the actual measurements taken for the temperature and the state of charge of the battery, in order to readjust the charging power and cooling power during charging, and not to be dependent on a temporary measurement error. In this resolution of the equations during charging, the nominal power $U_{no}$m of the equation (4) will be replaced with a mean voltage $U_{avg}$, for example obtained from a mapping as a function of the state of charge SOC, of the charge remaining to be charged, and of the current charging power. Moreover, the initial values for the temperature and the state of charge will be replaced with the measured values or, as a variant, estimated at the moment t. When these equations are thus used during charging, the method uses a regulation of the charging and cooling powers in order to reach the final values sought, which are the regulation setpoint values.

The final temperature sought may depend on certain particular conditions of the charging station, on the stock of batteries available for example. Mappings of final temperature values may be predefined.

As a variant, the cooling device 3 of the battery may provide a variable thermal resistance, by adjusting the flow rate and/or the temperature of cooling blown air.

In this case, the above equations make it possible to determine the optimum thermal resistance at each moment as a function of the battery charging power according to the following formula:

$$Rth = \frac{\frac{T_{end} + T_{ini}}{2} - 5}{R_{bat}\left(\frac{P_{ch}}{V U_{avg}}\right)^2 - \frac{(T_{end} - T(t)) \times C_p \times P_{ch}}{ASOC \times E_{bat}}}$$

In order to obtain the desired thermal resistance value, either the temperature of the cold source or the flow rate is modified.

The charging power can then be a fixed power, dependent on the limitations of the charging station and of the battery. The cooling device then, for example, varies the flow rate of cooling air in order to reach the computed thermal resistance Rth value, based on, for example, a mapping of Rth as a function of the air flow rate.

Finally, the charging method according to the invention makes it possible to compute the battery charging and cooling power in order to obtain the predefined final state of electric charge and temperature values in a minimum time. Notably, the method guarantees the achievement of the desired final temperature before or at the same time as the desired electric charge. These final values are parameters of the system and various values can be chosen depending on the state of the battery, the state of the charging station, etc. A mapping of final temperatures can be incorporated into the charger in order to take account of its activity (peak of activity, off-peak period) as an input datum.

Figure 3:
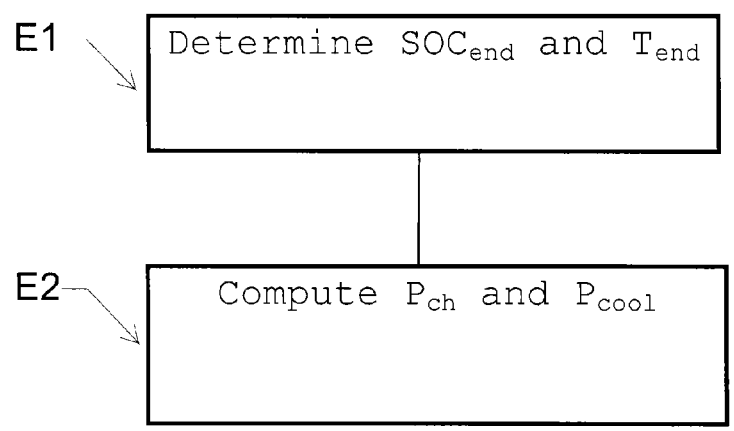
FIG. 3 represents an exemplary method for charging a battery.

Thus, as shown in FIG. 3, the method for charging a battery according to the invention comprises the following two essential steps E1, E2:

E1—determination of a final state of charge $SOC_{end}$ and a final temperature $T_{end}$ of the battery;

E2—computation of the optimum charging power $P_{ch}$ and/or of the optimum cooling power $P_{cool}$ for reaching the two final values $SOC_{end}$; $T_{end}$ in an optimum time.

Figure 2:
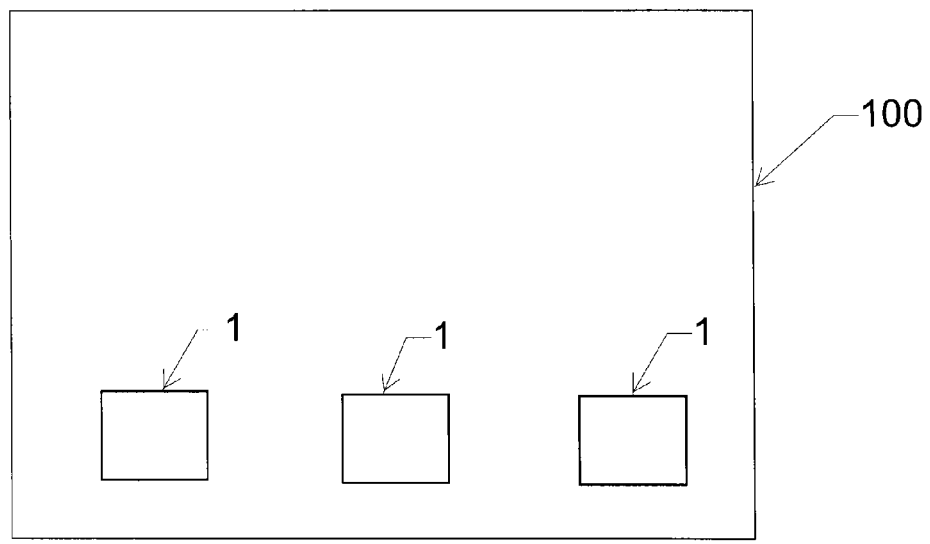
FIG. 2 represents schematically an exemplary battery charging station.

As shown in FIG. 2, the invention also relates to a battery charging station 100 using one or more chargers 1 as described above. As a variant, various battery chargers could share the same control unit 4.

The invention has been described for the charging of a battery of a motor vehicle. As a comment, it could be used for removable batteries, making it possible for example to exchange a discharged battery against a charged battery, the discharged battery thereafter being recharged independently. In such a case, the station must manage a stock of charged and discharged batteries, and can adapt the charging parameters according to the state of its stock, for example so as to accelerate charging by reducing the requirements concerning the final state of charge and/or the final temperature, if its stock of charged batteries is reduced. As a variant, the charging method may be used on batteries placed within a motor vehicle. As a comment, the invention applies to any charging of batteries, and is not restricted to the motor-vehicle field.

Furthermore, the charging method of the invention is compatible with any cooling device, irrespective of the cooling principle used, and likewise for any electric charging device. Finally, the equations (1) to (4) above have been given by way of examples; the principle of the invention still applies for any other equation system characterizing the electric charging and the cooling of a battery.

The invention claimed is:

1. A battery charger, comprising:
an electrical charging device which delivers a charging power;
a cooling device, which delivers a cooling power;

an input for receiving a final state of charge and a final temperature of the battery; and a control unit which computes the charging power and/or the cooling power necessary for reaching the two final values in a minimum time by considering equations $$\Delta T_{bat} = T_{end} - T_{ini} = \frac{(Q_{bat} - P_{cool})}{C_p} \times t_{ch} \quad (1)$$

$$t_{ch} = \frac{\Delta SOC \times E_{bat}}{P_{ch}} \quad (2)$$

$$P_{cool} = \frac{\left(\frac{T_{end} + T_{ini}}{2} - 5\right)}{Rth} \quad (3)$$

$$Q_{bat} = R_{bat}\left(\frac{P_{ch}}{U_{nom}}\right)^2 \quad (4)$$

wherein:
$T_{ini}$: temperature of the battery in each time frame [° C.];
$SOC_{ini}$: state of charge SOC of the battery;
$C_p$: calorific capacity of the battery [Wh/K];
$E_{bat}$: energy of the battery [Wh];
Rth: thermal resistance between the battery and blown air [K/W];
$R_{bat}$: electrical resistance of the battery [ohm];
$U_{bat}$: voltage of the battery [V];
$u_{nom}$: nominal voltage of the battery;
Qbat: charge of the battery;
$P_{cool}$: cooling power during charging [W];
$t_{ch}$: charging time remaining [h];
$P_{ch}$: charging power [W];
$P_{Ch,max}$: maximum charging power [W],
wherein the control unit controls the electrical charging device and the cooling device based on the charging power and/or the cooling power computed by the control unit.

2. The battery charger as claimed in claim 1, wherein the cooling device comprises a variable flow rate and/or a variable temperature of coolant, so as to modify the cooling power as a function of the charging power.

3. A station for managing batteries for supplying power to a drive motor of a motor vehicle, comprising at least battery charger as claimed in claim 1.

4. A method for charging a battery, comprising:
determining values of a final state of charge and a final temperature of the battery;
computing charging power and/or cooling power necessary for reaching the two final values in a minimum time, considering equations:

$$\Delta T_{bat} = T_{end} - T_{ini} = \frac{(Q_{bat} - P_{cool})}{C_p} \times t_{ch} \quad (1)$$

$$t_{ch} = \frac{ASOC \times E_{bat}}{P_{ch}} \quad (2)$$

$$P_{cool} = \frac{\left(\frac{T_{end} + T_{ini}}{2} - 5\right)}{Rth} \quad (3)$$

$$Q_{bat} = R_{bat}\left(\frac{P_{ch}}{\frac{P_{ch}}{U_{nom}}}\right)^2 \quad (4)$$

wherein:
$T_{ini}$: temperature of the battery in each time frame [° C.];
$SOC_{ini}$: state of charge SOC of the battery;
$C_p$: calorific capacity of the battery [Wh/K];
$E_{bat}$: energy of the battery [Wh];
Rth: thermal resistance between the battery and blown air [K/W];
$R_{bat}$: electrical resistance of the battery [ohm];
$U_{bat}$: voltage of the battery [V];
$U_{nom}$: nominal voltage of the battery;
Qbat: charge of the battery;
$P_{cool}$: cooling power during charging [W];
$t_{ch}$: charging time remaining [h];
$P_{ch}$: charging power [W];
$P_{Ch,max}$: maximum charging power [W].

5. The method for charging a battery as claimed in claim 4, wherein the computing defines a charging time making it possible to reach, in substantially a same time, the final state of charge and the final temperature of the battery.

6. The method for charging a battery as claimed in claim 4, wherein the determining values comprises determination of the final state of charge and of the final temperature of the battery as a function of some or all of the following parameters:
state of a charging station using the charging method;
state of a charger using the charging method;
state of the battery to be recharged.

7. The method for charging a battery as claimed in claim 4, wherein the equations are resolved before initiating charging of the battery and/or over a predetermined time period during the charging of the battery.

8. The method for charging a battery as claimed in claim 4, wherein a thermal resistance of a cooling device is fixed and the computing computes the charging power as a function of the thermal resistance.

9. The method for charging a battery as claimed in claim 8, wherein the charging power is computed by formula:

$$P_{ch} = \left(\frac{-B + \sqrt{\Delta}}{2A}\right)$$

wherein:

$$\Delta = B^2 - 4AC$$

$$\underbrace{\left[\Delta SOC \times E_{bat} \times R_{bat}\left(\frac{1}{U_{nom}}\right)^2\right]}_{A} \times P_{ch}^2 + \underbrace{(T_{ini} - T_{end}) \times C_p \times P_{ch}}_{B} + \underbrace{\Delta SOC \times E_{bat} \times \left(\frac{5 - \frac{T_{end} + T_{ini}}{2}}{Rth}\right)}_{C} = 0.$$

10. The method for charging a battery as claimed in claim 9, further comprising computing a maximum charging power dependent on a charging station and on the battery to be charged.

11. The method for charging a battery as claimed in claim 4, wherein a thermal resistance of a cooling device is variable and the computing computes the thermal resistance as a function of the charging power.

12. The method for charging a battery as claimed in one claim 4, further comprising reading a temperature, a state of charge, and potential other parameters characterizing a state of the battery and communicating a result to the charging device.

13. The method for charging a battery as claimed in claim 4, wherein the thermal resistance Rth is computed by formula:

$$Rth = \frac{\frac{T_{end} + T_{ini}}{2} - 5}{R_{bat}\left(\frac{P_{ch}}{U_{avg}}\right)^2 - \frac{(T_{end} - T(t)) \times C_p \times P_{ch}}{ASOC \times E_{bat}}}.$$

* * * * *